June 29, 1971  SHIZUO TANIGUCHI  3,589,010
METHOD OF MAKING CROWNS, BRIDGE WORKS, POST
CROWNS, DENTURES, DENTURE PLATES, AND
INLAYS, AND AN EQUIPMENT THEREFOR
Filed June 5, 1968  2 Sheets-Sheet 2
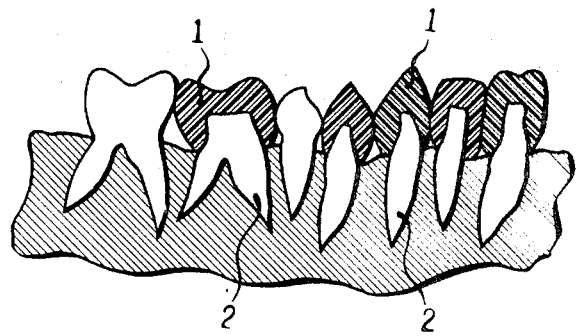
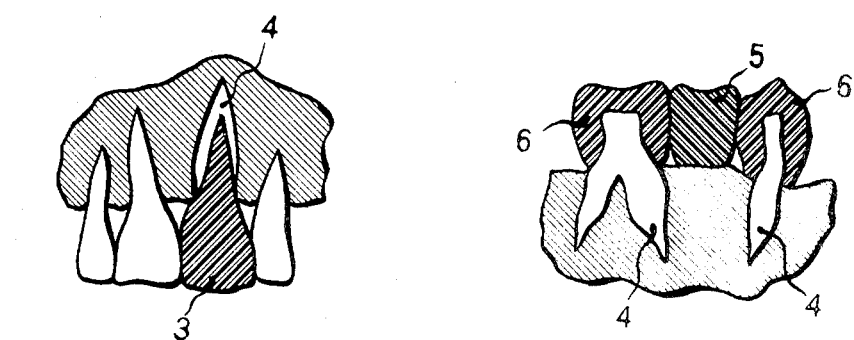
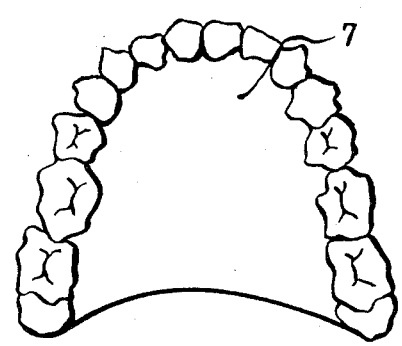
SHIZUO TANIGUCHI,
   INVENTOR
BY Wenderoth, Lind & Ponack.
   ATTORNEYS United States Patent Office 3,589,010
Patented June 29, 1971

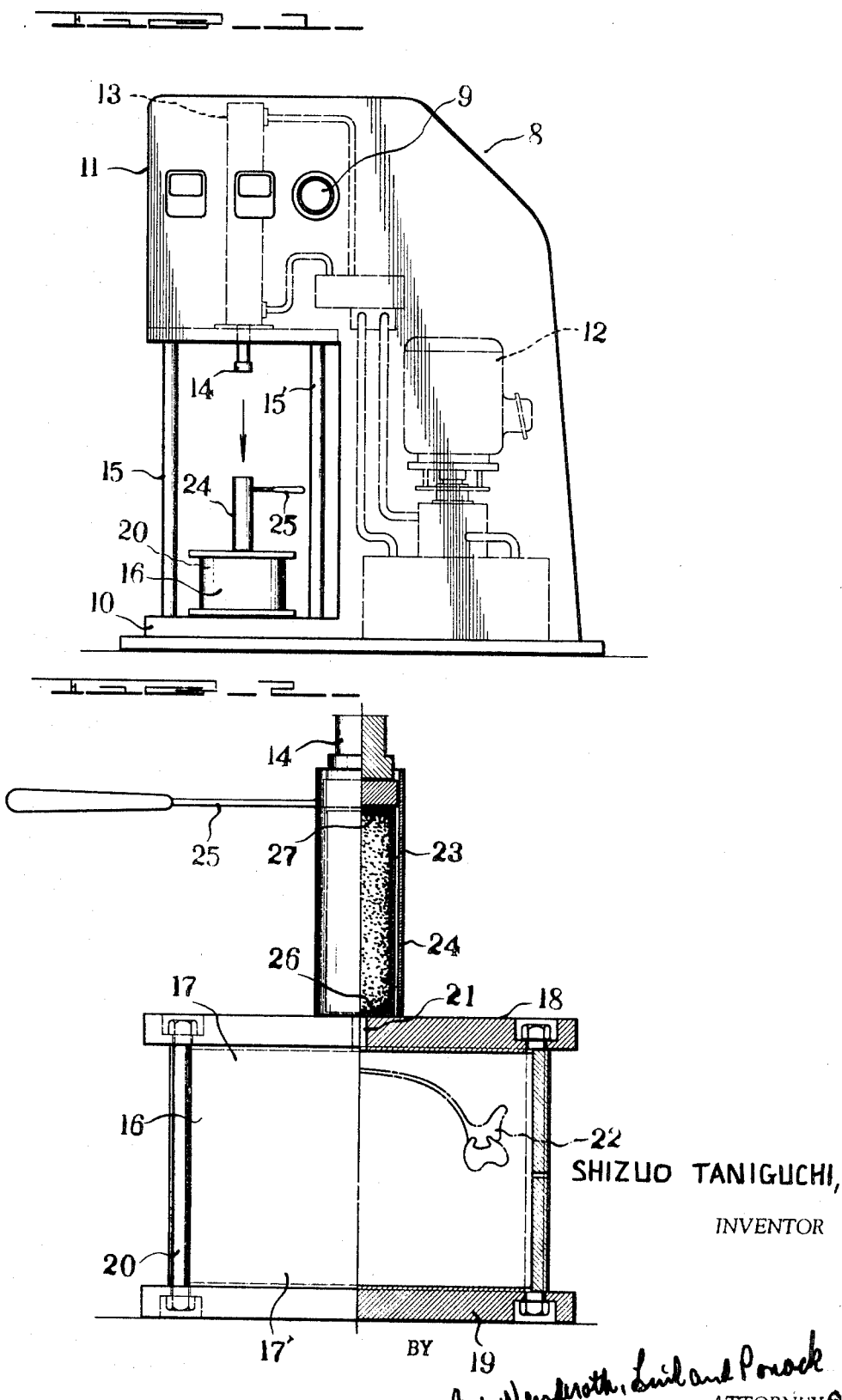

3,589,010
METHOD OF MAKING CROWNS, BRIDGE WORKS, POST CROWNS, DENTURES, DENTURE PLATES, AND INLAYS, AND AN EQUIPMENT THEREFOR
Shizuo Taniguchi, Osaka, Japan, assignor of fractional part interest to Daikin Kogyo Co., Ltd., Osaka, Japan
Continuation-in-part of application Ser. No. 518,635, Jan. 4, 1966. This application June 5, 1968, Ser. No. 734,681
Claims priority, application Japan, Jan. 1, 1965, 40/3,203; Sept. 22, 1965, 40/57,985
Int. Cl. A61c 13/00
U.S. Cl. 32—2
6 Claims

ABSTRACT OF THE DISCLOSURE

The present invention relates to crowns, bridge works, post crowns, denture plates and various inlay members composed of a polymeric material selected from a chlorotrifluoroethylene homopolymer or copolymer thereof *and* a vinylidenfluoride homopolymer or copolymer thereof. Examples of copolymers which may be used to produce the former copolymers are those produced from a chlorotrifluorethylene monomer and a vinylidenfluoride or vinylfluoride monomer, and examples of the latter copolymers are those produced from vinylidenfluoride and tetrafluoroethylene or hexafluoropropene. The above denture materials may also contain pigments or reinforcing materials therein. Also the denture materials may be covered with a film of a solution of the aforementioned polymeric materials and pigments to form a coating on the denture plates, etc.

This application is a continuation-in-part-of my pending application Ser. No. 518,635 filed Jan. 4, 1966.

This invention relates to a method of making crowns, bridge work, post crowns, dentures, denture plates, and inlays, and an apparatus therefor. The invention also relates to the crowns, bridge works, post crowns, dentures, and denture plates, and inlays made by said method.

A primary feature of this invention lies in the molding of granules, pellets, or other finely divided form of a polymeric material selected from the group consisting of chlorotrifluroethylene homopolymer and copolymer thereof with copolymerizable monomer, and vinylidenfluoride homopolymer and copolymer thereof with copolymerizable monomer, through a mold into the desired shape. The former copolymerizable monomer is to be selected from the group consisting of vinylidenfluoride, vinylfloride, tetrafluroethylene and hexafluropropene, and also the latter copolymerizable monomer is to be selected from the group consisting of vinylfluoride, tetrafluroethylene and hexafluropropene.

Another feature of the invention is that a pressure-responsive sealed container holding said polymeric material is positioned in such a manner that its lower end comes in close contact with a mold, with the upper end of said container being positioned immediately under the lower end of a pressing rod of a pressing mechanism, said sealed container being made of alminum or the like material and being heated by a heating device.

In another aspect, the present invention is concerned with the crown, bridge work, post crown, denture, denture plate, and inlay made from said resinous material by means of the above-mentioned method and apparatus.

In accordance with the convenitonal dental procedure, porcelain or acrylic material is formed in to various individual shapes, among which the one which looks like the client's natural tooth is chosen for the dental surgery scheduled for the same client. However, this surgery depends on the so-called crown and bridge arts which involve metal crown lining, jointing, and other technics using metals. It is also conventional practice to secure a pattern of the natural tooth and gum in the mouth, prepare a split mold from said pattern, fill manually an approximate denture into said split mold, plant the same in a denture plate, lock it in position, and, finally, boil or otherwise heat the same for prolonged time until it is coagulated in place.

However, porcelain dentes, which may be sufficiently hard, are brittle and vulnerable to directional cracking. Furthermore, this type of dentes tends to emit a louder biting sound or bouxism because it is generally manufactured in the same manner as ordinary household porcelain articles, in addition, further said type of dentes is too much difficult to be colored with any desired color.

Still another disadvantage of such an artificial tooth is its possibility of damaging the mating natural tooth. On the other hand, the tooth of acrylic resin is not as hard as desired, let alone its low density which makes the dentes quite liable to become worn out as the client brushes his teeth or ingests foods.

I have long been engaged in studies in the hope of improving the above-mentioned disadvantages of the conventional crowns, bridge works, dentures, denture plates, and inlay, and have ultimately succeeded in the formation in a very short period of time of crowns, bridge works, post-crowns, dentures, and denture plates which resemble closely natural teeth in surface hardness, smoothness, luster, and appearance, are free from directional cracking, possess a high degree of abrasion resistanee, and are free from bouxism.

In one preferred mode of embodiment of the principle of this invention, a sealed aluminum container capable of contraction under pressure or the like container is charged with pellets, granules, or the other finely divided form of a polymeric material selected from the group consisting of chlorotrifluorethylene homopolymer and copolymer thereof with copolymerizable monomer, and vinylidenfluoride homopolymer and copolymer thereof with copolymerizable monomer, and if desired, a mixture of said polymeric material, pigment which may be titanium oxide, cadmium yellow, cadmium red, carbon black, zinc oxide or barium sulfate and/or inorganic reinforcing material which may be glass fiber or mineral fiber. After it is sealed, the container is heated in an electric furnace at 150°–350° C. until the contents are molten, whereupon the lower end of said container is immediately brought into contact with an opening provided in a collapsible mold case containing a suitable mold or molds. Thus, when the upper end of said container is pressed by the pressing rod of a pressing system, the bottom wall of said container which, as above, is held in intimate contact with said mold case is burst open in the manner of an explosion, whereby creating an injection hole therein. Through this hole or opening, the molten mass flows out of said container under pressure into the metal mold contained in said case. This procedure gives rise to excellent crowns, bridge works, post-crowns, dentures, denture plates, or inlay, in an efficient manner. More specifically, the starting material pellets or granules may be prepared in the following examples.

EXAMPLE 1

Chlorotrifluoroethylene homopolymer (white powdery material) of which ZST value provided in ASTM D 143058 T is 420 secs. may be heated in said container at 310° C. for 10 mins. under elevated pressure to produce crowns and other products.

The physical properties of the final products are as follows:

Hardness: Shore Durometer D 84.

In addition, further said shore durometer may increase up to D 90 by means of the further annealing treatment thereof 180° C. x 1 hr.

It was registered that no discoloration had happened for 2 years on the products applied to 1000 persons.

EXAMPLE 2

Chlorotrifluroethylene copolymer (white powdery material) containing 3% of vinylidenfluoride of which ZST value provided in ASTM D 143058 T is 250 secs. may be heated in said container at 290° C. for 10 mins. under elevated pressure to produce crowns and other products.

The physical properties of final products are as follows:

Hardness: Shore Durometer D 84.

In addition, further said shore durometer may increase D 88 by means of the further annealing treatment thereof 170° C. x 1 hr.

It was registered that no discoloration had happened for 2 years on the products applied to 1000 persons.

EXAMPLE 3

Vinylidenfluoride homopolymer of which intrinsic viscosity ($\tau$) at 35° C. is 1.5 may be heated in the container at 290° C. for 10 mins. under elevated pressure to produce crowns and other products.

The physical properties of the final products are as follows:

Hardness: Shore Durometer D 83.

It was registered that no discoloration had happened for 12 months on the products applied to 4 persons.

EXAMPLE 4

Vinylidenfluoride copolymer containing 5% of vinylfluoride of which intrinsic viscosity ($\tau$) at 35° C. is 0.6 may be heated in the container at 250° C. for 10 mins. under elevated pressure to produce crowns and other products.

The physical properties of the final products are as follows:

Hardness: Shore Durometer D 83.

It was registered that no discoloration had happened for 6 months on the products applied to 1 person.

EXAMPLE 5

When, as the polymeric material, is selected chlorotrifluroethylene homopolymer of which ZST value provided in ASTM D 143058 T is 420 secs., it may be blended with the aforesaid pigments as follows:

|  | Parts |
| --- | --- |
| Chlorotrifluroethylene homopolymer (white powdery material) | 100 |
| Titanium oxide | 0.08 |
| Cadium yellow | 0.0034 |
| Cadium red | 0.0032 |
| Carbon black | 0.0003 |

Said mixture will be heated in said container at 310° C. for 10 mins. under elevated pressure to produce crowns and other products.

The physical properties of the final products are as follows:

Hardness: Shore Durometer D 85.

In addition, further said shore durometer may increase up to D 90 by means of the further annealing treatment thereof 180° C. x 1 hr.

As to the resulted advantage of the final products, we found any discoloration had never happened for 2 years on the products applied to 1000 persons.

EXAMPLE 6

Chlorotrifluoroethylene copolymer containing 3% of vinylidenfluoride, of which ZST value provided in ASTM D 143058 T is 250 secs. may be blended with glass fiber (diameter thereof 10μ and average length 50μ) and the underwritten pigments as follows:

|  | Parts |
| --- | --- |
| Chlorotrifluroethylene copolymer | 100 |
| Glass fiber | 1 |
| Titanium oxide | 0.08 |
| Cadium yellow | 0.0034 |
| Cadium red | 0.0032 |
| Carbon black | 0.0003 |

Said mixture will be heated in the aforesaid container at 290 C. for 10 mins. under elevated pressure to produce crowns and other products.

The physical properties of the final products are as follows:

Hardness: Shore Durometer D 87.

Further, said shore durometer may increase up to D 89 by means of the further annealing treatment thereof 170° C. x 1 hr.

And also, the resulted advantage of the final products will be found in such manner that no discoloration had been happened for 2 years on the products applied to 1000 persons.

EXAMPLE 7

Vinylidenfluoride homopolymer of which intrinsic viscosity ($\tau$) at 35° C. is 1.5 may be blended with the underwritten pigments as follows:

|  | Parts |
| --- | --- |
| Vinylidenfluoride homopolymer | 100 |
| Titanium oxide | 0.08 |
| Cadium yellow | 0.005 |
| Cadium red | 0.003 |
| Carbon black | 0.0003 |

Said mixture will be heated in the container at 290° C. for 10 mins. under elevated pressure to produce crowns and other products.

The physical properties of the final products are as follows:

Hardness: Shore Durometer D 86.

It was registered that no discoloration had been happened for 12 months on the products applied to 4 persons.

EXAMPLE 8

Vinylidenfluoride copolymer containing 5% of vinylfluoride, of which intrinsic viscosity ($\tau$) at 35° C. is 0.6 may be blended with the underwritten pigments as follows:

|  | Parts |
| --- | --- |
| Vinylidenfluoride copolymer | 100 |
| Titanium oxide | 0.08 |
| Cadium yellow | 0.0034 |
| Cadium red | 0.0032 |
| Carbon black | 0.0003 |

Said mixture will be heated in the container at 250° C. for 10 mins. under elevated pressure to produce crowns and other products.

The physical properties of the final products are as follows:

Hardness: Shore Durometer D 83.

It was registered that no discoloration had been happened for 6 months on the products applied to 1 person.

EXAMPLE 9

1 part of polychlorotrifluroethylene of which ZST value provided in ASTM D 143058 T is 420 secs. may be dissolved into 100 parts of 2, 4-dichlorobenzotrifluoride, in addition, further 0.00003 part of cadium yellow and 0.00003 part of cadium red are dispersed into said solution.

The resulted solution as shown in the above is to be applied (coated) to the outer surface of each of final products made by means of treatment as shown in said Example 1 or 2.

After said application, the products coated may be cured at 190° C. for 10 mins., in such manner that the step for coloring them is to be finished.

EXAMPLE 10

1 part of polyvinylidenfluoride of which intrinsic viscosity ($\tau$) at 35° C. is 1.5 may be dissolved into 100 parts of dimethylformamide further 0.00004 of cadium yellow and 0.00002 part of cadium red are dispersed into said solution.

The resulted solution as shown in the above is to be applied (coated) to the outer surface of each of final products made by means of treatment as shown in said Example 3 or 4.

After said application, the products coated may be cured at 170° C. for 10 mins., in such manner that the step for coloring them is to be finished.

As shown in the above-written Examples 5 and 6, it is very easy, in the present invention, to color crowns and others with any desired color.

Listed below are some of the chemical, physical and electrical properties of crowns and others finally produced according to the aforesaid examples:

(1) Artificial crowns and other products according to the present invention are highly resistant to intraoral heat and the heat of the food and drink ingested.

(2) The crowns and others manufactured according to the present invention are comparable to brass in feeling, and, when they must be corrected, may be easily processed by regular dental drills, cutters, and other instruments and finished by grinding and polishing.

(3) Translucent coloring is easy when materials are as thin as 3 millimeters or less, and may be used for lining and coating purposes. Thus, the materials may be utilized for the purpose of repairing worn teeth.

(4) Hardness of each of crowns and others produced according to the present invention is shown as Shore Durometer D 85, 90, 87, 89, 86 or 83, respectively.

(5) Said crowns and others are highly resistant to discoloration thereof for a long period.

(6) Said crowns and others are quite identical with natural teeth in color, luster, smoothness, and all of them are extremely tough and durable.

(7) And especially, in the present invention, unlike the conventional porcelain dentures which make it necessary to bake and cut each dent, is provided a useful means whereby a great many crowns and others may be easily molded in a continuous manner. It also is a great advantage of the present invention that without employing such costly materials as gold, silver, platinum and, other alloys, crowns, bridge works, dentes, inlays, and other dental products of excellent quality may be manufactured easily and at low cost.

In addition, further pellets prepared by admixing affinitized finely divided or short glass fiber with a plastisol of the above materials are easy to handle and permit easy and accurate weighing of the materials expected to go into crowns or other products. Thus, the invention provides a means of making varieties of crowns and others which are not only tough and resistant to abrasion, but also low in contraction and free from bouxism. It is to be noticed that small amounts of inorganic reinforcing material may be incorporated in the molding composition hereinbefore described.

Other features, effects, and advantages of the present invention will become apparent as the description proceeds, reference being had to the accompanying drawings, in which:

FIG. 1 is a side-elevational view of the apparatus to be employed in the method of this invention;

FIG. 2 is a partial section, on exaggerated scale, showing the connection between the split-mold case and the sealed container within the apparatus illustrated in FIG. 1;

FIG. 3 is a schematic view, explaining crowns for various teeth of this invention;

FIG. 4 is a schematic view, showing a primoris post crown of upper jaws of the invention;

FIG. 5 is a schematic view of a mandibular molar bridge work of the invention;

FIG. 6 is a schematic view showing the artificial dentes of FIG. 5 as arranged tentatively for the preparation of a denture; and FIG. 7 is a plan view of the dentes of FIG. 6 as mounted on a plate.

Referring, now, to FIG. 3, a single crown 1 is mounted on a natural dent 2, while, as shown in FIG. 4, a primoris post crown 3 is mounted on a natural dent 4, with the root portion of said dent 4 remaining exposed. In FIG. 5, a bridge work 5 is connected with crowns 6 covering two adjoining natural dentes 4 and 4. In FIG. 6, the left half of a dent for a denture plate is tentatively arranged, while FIG. 7 shows the artificial dentes mounted on a denture plate 7.

In FIGS. 1 and 2, an oil pressure molding mechanism 8 provides a pressure gage 9, a base 10, a frame 11, a motor 12, a hydraulic system 13, a pressing rod 14 of a pressing system and bars 15, 15. A metal split-mold case 16 is mounted on said base 10, and said metal split-mold case 16 consists of upper and lower halves 17 and 17'. The upper and lower openings of said case 16 are covered with top cover 18 of said upper halve 17 and a bottom cover 19 of said lower halve 17'. Said halves 17 and 17' are removably connected with the lower and upper ends thereof through respective bolts 20, 20. In the center of said top cover 18 is provided an orifice 21, and a plaster or metal mold 22 is contained in said case 16. A required number of molds representing the dentes primoris, molaris, etc., of a denture are set in said case 16. An aluminum container 23 or any other container capable of contraction under pressure as described above is charged with pellets of the abovementioned resin composition. The container 23 is encased in an outer casing 24 which is provided with a handle 25. Container, in this state, is heated at the temperatures mentioned hereinbefore, and immediately thereafter, a bottom wall 26 of said container 23 is brought into contact with the rim of said orifice 21 formed in said top cover 18. Through said hydraulic system 13, the lower end of said rod 14 is brought into contact with a top wall 27 of said container through the upper opening of said case 16. As the rod 14 travels downward, the top wall 27 of said flexible container within said outer casing is pressed, whereupon the container is forced to shrink. The internal pressure built up within said container in this manner causes a bottom wall 26 thereof to burst open thereby creating an opening in said bottom wall. The molten composition is then forced out through said opening and said orifice 21 into the molds 22 within said case 16. In this manner, a great number of crowns and other products are molded in one operation. It is also possible to obtain a complete denture plate carrying the required dentes by forcing the material composition as above into a metal mold in which the finished artificial dentes prepared above have been properly arranged.

What I claim is:

1. A crown, bridge work, post crown, denture, denture plate and inlay member, said member being comprised of a polymeric material selected from the group consisting of a chlorotrifluoroethylene homopolymer and a copolymer thereof with a copolymerizable monomer, and a vinylidenfluoride homopolymer and copolymer thereof with a copolymerizable monomer; the former copolymerizable monomer being selected from the group consisting of vinylidenfluoride, vinylfluoride, tetrafluroethylene and hexafluoropropene, and the latter copolymerizable monomer being selected from the group consisting of vinylfluoride, tetrafluroethylene and hexafluoropropene.

2. A crown, bridge work, post crown, denture, denture plate and inlay member as claimed in claim 1, wherein said member is comprised of said polymeric material and a suitable pigment selected from the group consisting of titanium oxide, cadmium yellow, cadmium red, carbon black, zinc oxide and barium sulfate.

3. A crown, bridge work, post crown, denture, denture plate and inlay member as claimed in claim 1, wherein said member is comprised of said polymeric material and a suitable inorganic reinforcing material selected from the group consisting of glass fiber and mineral fiber in or without the presence of a suitable pigment selected from the group consisting of titanium oxide, cadmium yellow, cadmium red, carbon black, zinc oxide and barium sulfate.

4. A crown, bridge work, post crown, denture, denture plate and inlay member as claimed in claim 1, wherein said member comprised of said polymeric material is covered with a film formed by coating on the outer surface thereof a solution of said polymeric material and a suitable pigment selected from the group consisting of titanium oxide, cadmium yellow, cadmium red, carbon black, zinc oxide and barium sulfate.

5. A crown, bridge work, post crown, denture, denture plate and inlay member as claimed in claim 2, wherein said member is comprised of said polymeric material and said pigment is covered with a film formed by coating on the outer surface thereof a solution of said polymeric material and a suitable pigment selected from the group consisting of titanium oxide, cadmium yellow, cadmium red, carbon black, zinc oxide and barium sulfate.

6. A crown, bridge work, post crown, denture, denture plate and inlay member as claimed in claim 3, wherein said member comprised of said polymeric material and said inorganic reinforcing material is covered with a film formed by coating on the outer surface thereof a solution of said polymeric material and a suitable pigment selected from the group consisting of titanium oxide, cadmium yellow, cadmium red, carbon black, zinc oxide and barium sulfate.

References Cited
UNITED STATES PATENTS

| | | | |
|---|---|---|---|
| 3,084,436 | 4/1963 | Landry | 32—2 |
| 3,244,684 | 4/1966 | Teumac | 260—92.1 |
| 3,285,898 | 11/1966 | MacKenzie | 260—92.3 |
| 3,356,649 | 12/1967 | Wolf | 260—73 |

ROBERT PESHOCK, Primary Examiner